June 24, 1930.  G. EGLOFF  1,766,987
PROCESS OF CRACKING PETROLEUM OIL
Original Filed Oct. 18, 1923
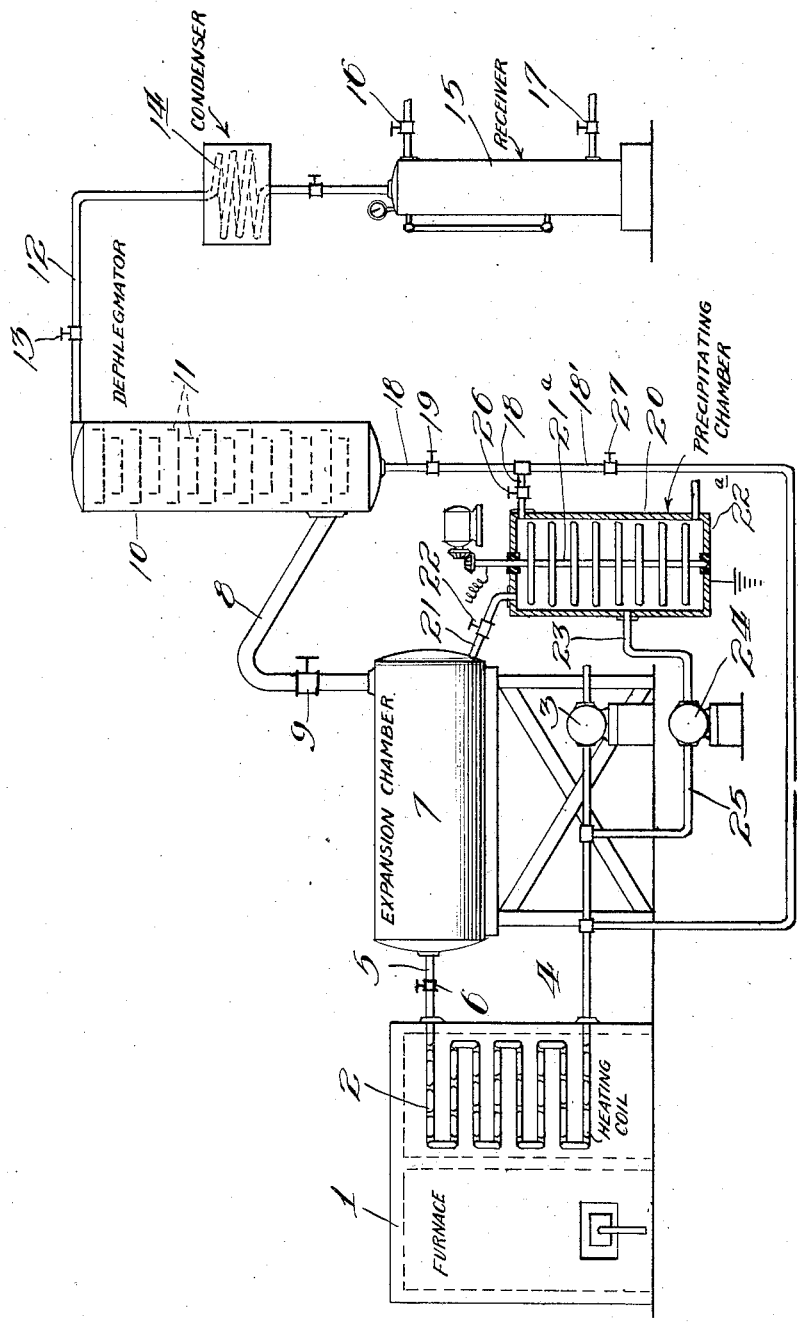

Patented June 24, 1930

1,766,987

UNITED STATES PATENT OFFICE

GUSTAV EGLOFF, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

PROCESS OF CRACKING PETROLEUM OIL

Application filed October 18, 1923, Serial No. 669,223. Renewed July 2, 1928.

This invention relates to improvements in process of cracking petroleum oil, and refers more particularly to that type of process in which the oil is passed through a heating coil, and thence to an expansion chamber, where vaporization takes place. The vapors are removed from the expansion chamber, subjected to reflux action and reflux condensate returned to the coil for further treatment.

One of the conditions to be noted in a process of this kind is to keep the apparatus as free as possible from carbon deposits which tend to stop the process. At the same time in the treatment of certain oil it may be desirable to recrack the residue, but this results in the clogging up of the coils, as the residue, of course, contains large percentages of the pitchy jell-like substances, which tend to clog up the tubes.

The object of the present invention is to provide as a part of the operation of a continuous process a step designed to precipitate out large parts of these pitchy like bodies and permit the rerunning the residue through heating coil.

The invention will be understood from the following description, reference being had to the accompanying drawing, in which the single figure represents a somewhat diagrammatic view, partly in side elevation and partly in vertical section of the apparatus.

Referring to the drawings (1) designates the furnace in which is mounted the heating coil (2). The raw oil is fed to the coil by means of feed pump (3) and feed line (4) and delivered from the coil by transfer line (5) having throttle valve (6) into one end of the horizontally extending chamber (7). Vapors are removed from the expansion chamber (7) by pipe (8) having throttle valve (9), which pipe (8) leads to the lower end of dephlegmator (10), which dephlegmator has baffles (11) and vapor pipe (12), having throttle valve (13) and leading to condenser coil (14). The lower end of condenser coil (14) is connected to the top of a conventional receiver (15), which receiver is provided with pressure control valve (16) and liquid drawoff valve (17).

The reflux condensate is drawn out of the lower end of the dephlegmator 10 through pipe (18) controlled by throttle valve (19), which pipe (18) is connected to the upper end of a precipitating chamber (20). The liquid residue is drawn off from the lower portion of the expansion chamber through pipe (21) having valve (22), and is conducted into the upper end of said chamber (20). The precipitating chamber is provided with a revolving electrode (21$^a$) suitably insulated from the shell (20) which is grounded as shown at (22$^a$), the arrangement being such as to cause an electrical current to pass through the oil, which electrical current tends to precipitate out the solid or pitchy bodies contained in the residue and reflux. The mixture of residue and reflux condensate after being so electrically treated is drawn off through pipe (23) by means of pump (24) and thence fed by pipe (25) back to the feed line (4).

In carrying out the process the entire system, with the exception of the precipitating chamber, may be maintained under a super-atmospheric pressure of 100 pounds or more, and the oil heated to a cracking temperature of 800° F. The oil in the precipitating chamber (20) may be under atmospheric pressure, which can be accomplished by suitably regulating the valves shown.

This arrangement permits of the rerunning of the residue freed from its pitchy or solid like bodies, which will tend to clog up the heating tubes.

If desired, only part of the reflux condensate need be sent to the precipitating chamber. This may be accomplished by employing the bypass line (18′) and by suitably controlling the valves (26) and (27) shown on the drawings.

I claim as my invention:

1. A process of cracking oil, consisting in passing oil through a heating coil and thence through an expansion chamber, where it is maintained at cracking conditions of temperature and pressure, taking off vapors from the expansion chamber and subjecting them to a reflux condensing action and withdrawing reflux condensate, drawing off residuum from said expansion chamber and subjecting said residuum and reflux condensate to the action of an electrical current to separate therefrom the solid pitch-like constituents therein, and in returning the pitch-free residual oil and reflux condensate to said coil.

2. A process for cracking hydrocarbon oil comprising subjecting the oil to cracking conditions of temperature and pressure in a still, taking off vapors, subjecting the same to reflux condensation, drawing off residue from the still and commingling the same with reflux condensate resulting from the subjection of the vapors to the reflux condensing action and subjecting the commingled residue to the action of an electric current to separate therefrom solid and pitch-like constituents and reintroducing the residual oil and reflux condensate free from such constituents into the still.

GUSTAV EGLOFF.